Patented Aug. 4, 1936

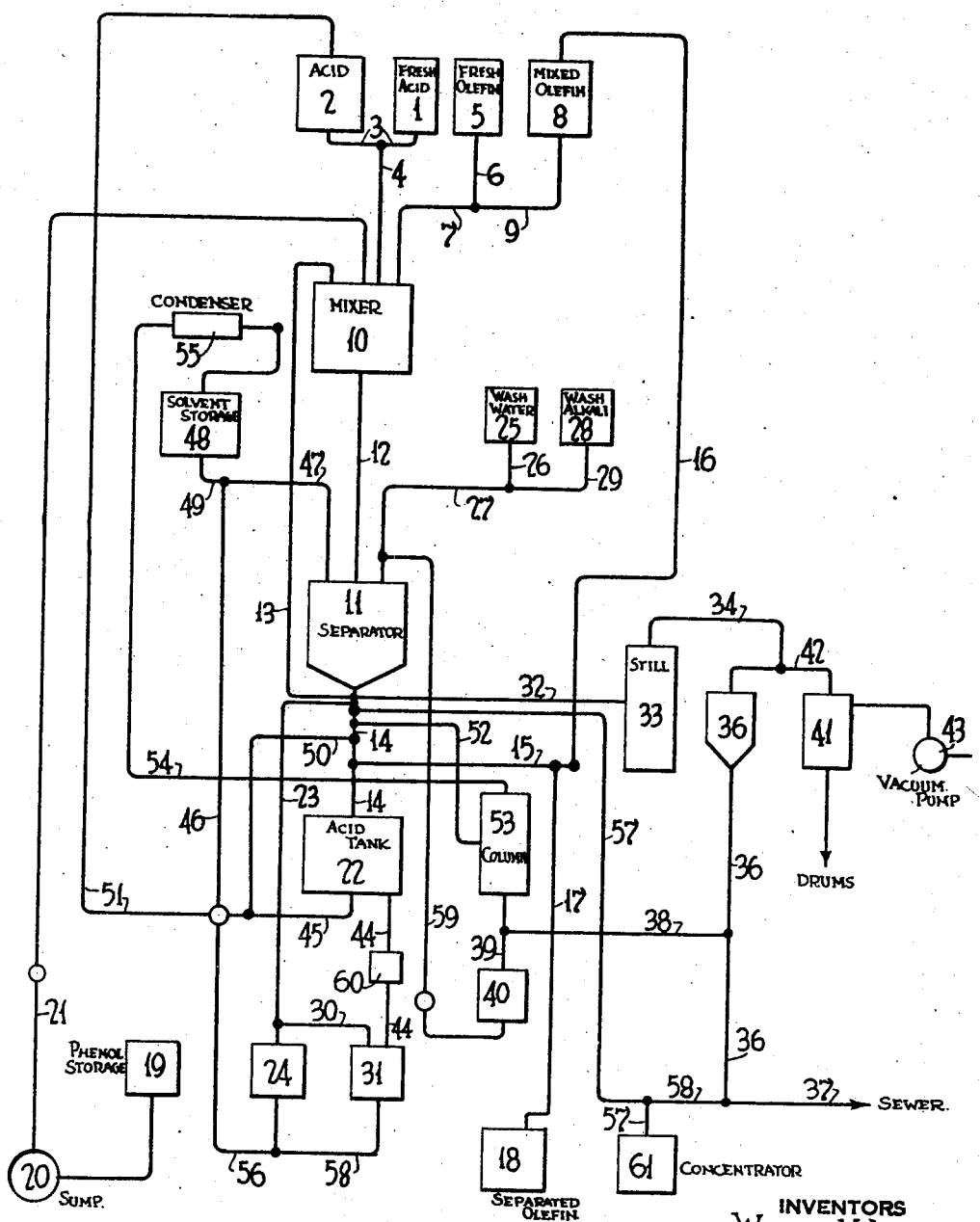

2,050,188

UNITED STATES PATENT OFFICE 2,050,188

METHOD OF PRODUCING DERIVATIVES OF HYDROXY ARYL COMPOUNDS

William M. Lee, Bala-Cynwyd, Pa., and Lee H. Clark, Charleston, W. Va., assignors to The Sharples Solvents Corporation, Philadelphia, Pa., a corporation of Delaware Application July 20, 1932, Serial No. 623,486

21 Claims. (Cl. 260—150)

This invention relates to a method for reacting hydroxy aryl compounds with olefines and with other unsaturated hydrocarbons and to products thereof. In the practice of this invention hydroxy aryl compounds are reacted with unsaturated hydrocarbons to form hydrocarbon aryl ethers which may be recovered as such and some of such ethers may be rearranged by further treatment in accordance with this invention to produce hydrocarbon addition products of hydroxy aryl compounds. In either case the product of the reaction is a condensation product of an aryl hydroxy compound and an unsaturated hydrocarbon. Also, in accordance with this invention, the olefine or olefines to be reacted with an aryl hydroxy compound may be included in a mixture containing both normal and branched-chain isomers thereof, as hereinafter set forth, and a novel feature of the invention relates to the separation, from such a mixture, of the olefines which are to be reacted with an aryl hydroxy compound, followed by the reaction of one or more of the constituents of the separating step separately with the hydroxy aryl compound; and further novel features of this invention reside in the utilization in the reaction, of an agent employed to assist in effecting the desired separation.

The hydroxy aryl products and the hydrocarbon aryl ethers produced in accordance with this invention possess commercial value, especially the hydroxy aryl products which possess great value as germicides and insecticides and as ingredients in the manufacture of resins. The ethers have been found to have value as an ingredient of varnishes for the prevention of surface skinning. In this connection, an important feature of this invention resides in the production of hydroxy aryl products containing an alkyl radical having four to six carbon atoms. An important commercial feature of this invention is that commercially occurring olefine-containing mixtures, which have not heretofore been regarded as adapted for the production of useful substances by reaction with hydroxy aryl compounds, are successfully utilized for that purpose.

Although the principal object of the present invention has been to devise a method for the production of alkyl substitution products of phenol such as the alkyl phenylic ethers and the alkyl phenols, it is applicable in certain of its broader aspects to the condensation of other olefinic substances including hydrocarbons such as pinene, isoprene, indene and cyclo-hexene with phenol.

Examples of hydroxy aryl compounds capable of being employed in the practice of this invention are single ring phenols including monohydric phenol commonly and herein called phenol, di-hydric phenols such as quinol, catechol or resorcinol, tri-hydric phenols such as pyrogallol, hydroxy quinol or phloroglucinol; poly-ring phenols which may be mono- or poly-hydric, such as naphthol and other hydroxylic derivatives of substances having a plurality of similarly related benzene rings; halogen derivatives of the foregoing single and poly-ring phenolic substances, including mono- and poly-halogen substitution products of which examples are ortho-, meta- and para-chlor-phenol and di- and tri-chlor-phenol; and such derivatives of the foregoing single and poly-ring phenolic substances as mono- and poly-hydrocarbon substitution products, of which simple examples are methyl phenol (cresol), ethyl, propyl, butyl, amyl or hexyl phenols and phenolic substances, and of which more complex examples are carvacrol, thymol, pseudo-cumenol, orcinol, adjacent-o-xylenol, asymetric-o-xylenol, para-xylenol and eugenol.

In fact, hydroxy aryl compounds herein contemplated, for use in the reaction which effects condensation of such substances with olefines and other unsaturated hydrocarbons, comprise all hydroxy aryl compounds which contain one or more benzene rings and a hydroxyl radical and which are capable of being condensed with an unsaturated hydrocarbon. So long as the hydroxy aryl compound so employed as a starting material, contains such hydroxyl radical the product can be a phenylic ether; and if it contains also one or more hydrogen atoms, presumably attached directly to a carbon atom of a benzene ring therein, and capable of being replaced by an olefine or other unsaturated hydrocarbon with which the hydrogen atom combines, the final product may be either an ether or a hydroxy aryl compound.

When olefines of the ethylene series are employed in the practice of this invention alkyl aryl hydroxy compounds may be produced as follows:

Primary alkyl aryl hydroxy compound  $R \cdot CH_2 \cdot P$
Secondary alkyl aryl hydroxy compound  $R_2 \cdot CH \cdot P$
Tertiary alkyl aryl hydroxy compound  $R_3 \cdot C \cdot P$ wherein P is an aryl hydroxy radical which comprises one or more benzene rings and has a hydroxyl radical attached to a carbon atom of a benzene ring and has a hydrogen atom or other atom or a radical attached respectively to remaining carbon atoms of the benzene ring or rings thereof, and the resulting compounds are characterized by the primary grouping $R \cdot CH_2$., the secondary grouping $R_2 \cdot CH \cdot$ and the tertiary grouping $R_3 \cdot C$., adjacent the aryl hydroxy radical. In the reaction leading to such aryl hydroxy end products the ethers formed, which may be preserved or may be rearranged as herein described, may comprise such primary, secondary and tertiary hydrocarbon radicals attached by an oxygen atom to one of the carbon atoms of a radical comprising one or more benzene rings which may have a hydrogen atom or other atom or a radical attached respectively to remaining carbon atoms thereof.

When the hydroxy aryl compound introduced into the reaction as a starting material is "phenol", the "phenylic ether" formed is a "phenyl ether" comprising the unsaturated hydrocarbon, with an additional hydrogen atom, joined by an oxygen atom to a carbon atom of a single benzene ring which has single hydrogen atoms respectively attached to each of the five remaining carbon atoms thereof, and the hydrocarbon aryl hydroxy compound formed is a mono-hydrocarbon substitution product of phenol and comprises a single benzene ring having a hydroxyl radical attached to one carbon atom thereof, the unsaturated hydrocarbon with an additional hydrogen atom attached to another carbon atom thereof, and single hydrogen atoms respectively attached to the four remaining carbon atoms thereof. When the unsaturated hydrocarbon introduced into the reaction as a starting material is a hydrocarbon of the ethylene series, the ether formed is an "alkyl phenyl ether" and the compound formed is an "alkyl phenol", if the hydroxy aryl compound used as a starting material is phenol. When the starting material is a hydroxy aryl compound which is more complex than phenol and which comprises a hydroxyl radical attached either to a plurality of benzene rings or to one or more benzene rings having one or more radicals or atoms other than hydrogen atoms attached respectively to carbon atoms thereof other than that carbon atom to which said hydroxyl radical is attached, the resulting compounds comprising ethers and hydrocarbon aryl hydroxy compounds bear the same relation to the more complex starting material, as the compounds resulting from phenol as above described bear to phenol used as a starting material. Thus, compounds resulting from the reaction of an unsaturated hydrocarbon and an hydroxy aryl compound in accordance with this invention may be hydrocarbon aryl ethers or hydrocarbon aryl hydroxy compounds. The resulting hydrocarbon aryl ethers include phenyl ethers resulting from the use of phenol, alkyl phenyl ethers resulting from the use of phenol in connection with an olefine, alkyl aryl ethers resulting from the use with an olefine of a more complex hydroxy aryl compound, and other hydrocarbon aryl ethers resulting from the use of such more complex hydroxy aryl compound with other unsaturated hydrocarbons. The resulting compounds may be mono-hydrocarbon substituted phenol resulting from the use of phenol with any unsaturated hydrocarbon, alkyl phenol resulting from the use of phenol with an olefine, alkyl aryl hydroxy compound of more complex nature resulting from the use of an olefine with a more complex hydroxy aryl compound, and other hydrocarbon aryl hydroxy compounds resulting from the use of any unsaturated hydrocarbon with more complex hydroxy aryl compounds.

For the purpose of affording a clear understanding of this invention and giving specific illustrations thereof, but with the understanding that this invention is not limited thereto, particular reference will be made herein to the preparation of amyl phenol from a mixture of normal and branched chain amylenes containing contaminating hydrocarbons such a pentane. Such a mixture is produced by a process, now in commercial operation, for the preparation of alcohol in which the saturated hydrocarbons of the paraffin series having four to six carbon atoms, (i. e., butane and the higher gasoline hydrocarbons), are chlorinated under the action of heat alone at a temperature in the neighborhood of 500° F., the chlorinated hydrocarbons being separated from the remaining products and hydrolyzed by treatment with caustic soda in the presence of water and an ester of a substantially water-insoluble fatty acid, with the resulting production of alcohol and unsaturated olefinic substances corresponding in carbon atom content to the original hydrocarbon used. If such process be employed using pentane as a raw material, there will be produced at the completion of the process amyl alcohols and, as a by-product or residue, a mixture of products of which about 42% to 73% comprises one or more normal isomers of amylene, about 20% to 40% comprises one or more branched chain isomers of amylene, and about 7% to 18% comprises pentane.

It is believed that the normal amylene in the mixture comprises principally the following normal amylene isomer:

Symmetrical methylethylethylene
Beta amylene $CH_3-CH_2-CH=CH-CH_3$
Pentene —2

The normal amylene in the above mixture, however, may comprise other normal amylenes such as the following:

Normal propylethylene
Pentene —1    $CH_3-CH_2-CH_2-CH=CH_2$

It is immaterial, however, for the purpose of this invention which of the above isomers of normal amylene are present or whether more than one of the isomers of normal amylene are present in the mixture.

The branched chain amylene isomer which is believed to predominate in the mixture of normal and branched chain amylenes above referred to is

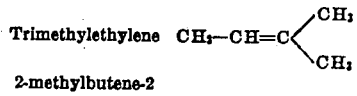

2-methylbutene-2

It may be, however, that branched chain amylenes of the following formulæ are also present, Unsymmetrical methyl ethyl ethylene
Alpha-amylene
2-methylbutene-1

Isopropylethylene
2-methylbutene-3

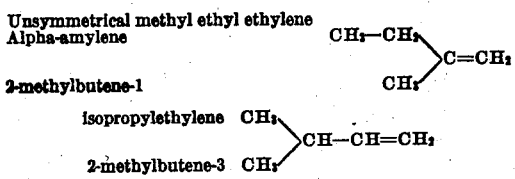

While reference has been made to a particular commercially-occurring mixture of normal and branched chain amylenes, it will be understood that features of the present invention are applicable generally to any mixture of olefines of the ethylene series however produced. For example, such mixture of olefines may also be produced by passing aliphatic chlorinated hydrocarbons through a heated tube in vapor phase to cause HCl to be split off giving olefines having a carbon atom content the same as the hydrocarbons originally chlorinated or by decomposition of higher branched chain alcohols in making esters. Thus features of this invention are applicable to the treatment of any mixture of normal olefine isomers and branched chain olefine isomers of the ethylene series in any relative proportion. Moreover, features of this invention are applicable also to the treatment of normal and branched chain olefines as separated from each other and to other unsaturated hydrocarbons and to olefine inorganic esters obtained from alcohol.

Different isomeric olefines of the ethylene series such as the various isomeric amylenes above referred to are found by experiment to exhibit different behavior, in reacting with hydroxy aryl compounds to form alkyl reaction products. For example, it was found that under similar conditions the branched chain amylene isomers as above defined exhibit about the same behavior and react with hydroxy aryl compounds to form amyl aryl hydroxy compounds while the normal amylene isomers exhibit a different behavior and react to form amyl aryl ethers under about the same conditions. Thus, if attempt is made to treat a mixture of olefines such as the mixture of amylenes above described with phenol, for example, there results a mixture of amyl phenols, amyl phenyl ethers and unreacted hydrocarbons, which has little or no commercial value and from which it is difficult or practically impossible to separate the different components. Further difficulty is encountered in that upon attempt to increase the severity of the treatment to convert the normal amylenes to amyl phenols, for example, the branched chain amylenes rapidly decompose forming diamylenes and other undesirable polymerization products.

By the isolation of the normal olefines, however, and the application thereto of more severe conditions than in the case of the branched chain olefines, these normal olefines can likewise be reacted with phenol to produce alkyl aryl hydroxy compounds, the normal olefines forming secondary alkyl aryl hydroxy compounds.

If attempt is made to separate the various isomeric constituents of mixed olefines by fractionation, the boiling points of the various isomers are so close that a complete or adequate separation is difficult. It is a feature of this invention that an effective separation of mixed olefines can be obtained by chemical means, into groups which will substantially uniformly respond to different given treatments for the production of secondary compounds on the one hand and tertiary compounds on the other. It is a further feature of this invention that the chemical treatment in the separation step may preferably comprise also part of the chemical treatment which enters into the conversion of the olefines to alkyl aryl hydroxy compounds.

When the olefine employed in the practice of this invention is a branched chain olefine the resulting ether or alkyl aryl hydroxy compound, as the case may be, is in the tertiary form or in the secondary form in a proportion dependent upon the relative position of the double bond of the olefine with respect to the branch point of the olefine when relatively mild reaction conditions are maintained. When the double bond is attached to the carbon atom from which the branch extends the resultant ether or hydroxy compound will be substantially all in the tertiary form. When one carbon atom lies between the double bond and the carbon atom from which the branch extends, most of the reaction product will be in the tertiary form but usually some of it will be in the secondary form. When two or more carbon atoms lie between the double bond and the carbon atom from which the branch extends, the major portion of the reaction product will be in the secondary form and a minor portion will be in the tertiary form so long as relatively mild reaction conditions are maintained. In such case the proportion in which the final product is tertiary may be increased by increasing the severity of the reaction conditions. For example, branched chain hexene having the double bond attached to the carbon atom from which the branch extends and of which the formula is:

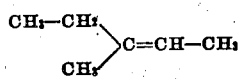

can be readily reacted to produce a reaction product in the tertiary form, but branched chain hexene having two carbon atoms lying between the double bond and the carbon atom from which the branch extends and of which the formula is:

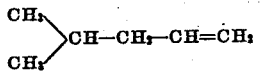

gives a reaction product which is chiefly secondary and of which only a minor proportion is tertiary. As herein set out, more intense reaction conditions are necessary in the production of secondary alkyl aryl hydroxy compounds from secondary ethers, and it may be desirable to retain with the normal olefines in the practice of this invention the branched chain olefines of the type in which two or more carbon atoms lie between the double bond and the carbon atom from which the branch extends. This is readily accomplished by adjustments of the proportion and concentration and contact period of the acid in view of the fact that that type of olefine is absorbed less readily, in accordance with one of the herein described features of this invention, in sulphuric acid, than is the type in which the double bond is in close proximity to the branch.

To more specifically illustrate this invention, it has been found that iso amylene, for example, reacts with phenol, for example, in the presence of sulphuric acid to form para tertiary amyl phenol and relatively small amounts of ortho tertiary amyl phenol. While it is to be understood that this invention is not to be dependent upon the correctness of any formulae or indicated reactions given herein in describing this invention it is believed that the reactions involved in reacting trimethylethylene, for example, with phenol, under certain conditions illustrated below are as follows:

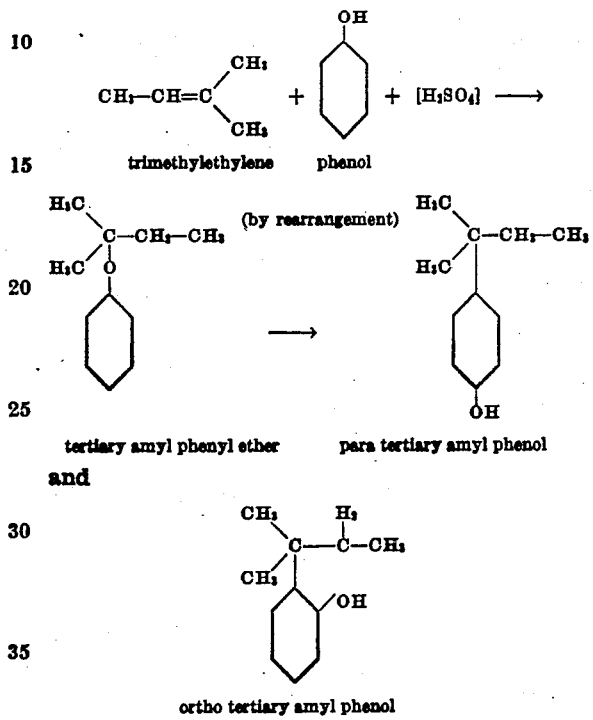

tertiary amyl phenyl ether    para tertiary amyl phenol and ortho tertiary amyl phenol Unsymmetrical methylethylethylene also reacts in a similar way to produce para tertiary amyl phenol, and relatively small amounts of ortho tertiary amyl phenol.

Under similar conditions, it has been found that the normal amylene isomers do not react to produce amyl phenols but produce secondary amyl phenyl ethers. While these secondary phenyl ethers can be converted into ortho and para secondary amyl phenol by the use of additional sulphuric acid and heat, their conversion requires much more severe conditions of treatment than the corresponding conversion of the branched chain olefines as described above.

It is a feature of this invention that branched chain amylenes, for example, can be substantially isolated from a mixture of normal and branched chain amylenes and at the same time secured in the presence of sulphuric acid for immediate conversion if desired, to tertiary amyl phenol by selective absorption of branched chain amylene contained in a mixture of normal and branched chain amylenes in sulphuric acid. The concentration of the sulphuric acid should be sufficient to secure sufficiently rapid absorption of the branched chain amylenes for commercial operation while maintaining the absorption of the normal amylenes at a rate so slow as not to be substantially appreciable. The concentration of the acid should also be sufficiently low to avoid excessive decomposition of the branched chain amylenes to form undesirable polymerization products. Temperature of reaction and duration of contact are also important factors in the avoidance of such undesirable products.

To give an illustration it has been found that when a mixture of normal and branched chain amylenes is treated with sulphuric acid of about 62% concentration, at a temperature of about 20° C. to about 28° C. for about one hour, branched chain amylenes are absorbed satisfactorily in the acid while normal amylenes are not substantially absorbed. Moreover there is only slight polymerization of branched chain amylene. While the above conditions have been found to be satisfactory, it is apparent that they can be modified considerably in the practice of this invention. In this connection it must be borne in mind that increase in acid concentration and in temperature increases the rate of absorption but also increases the rate of formation of polymerization products. However, by carrying out the absorption without unnecessary delay and subjecting the absorbed branched chain amylenes to subsequent treatment, also without unnecessary delay, the formation of polymerization products is relatively small and not objectionable commercially in the practice of this invention. The illustration above given has been found in commercial operations to give a satisfactory balance between the strength of acid and temperature and period of contact in securing desirably rapid selective absorption of branched chain amylenes without the excessive formation of undesirable polymerization products.

It is a further feature of this invention that the selective absorption of branched chain amylenes in sulphuric acid can be so effected as to saturate substantially completely the acid with branched chain amylenes and at the same time strip substantially completely the mixed amylenes of branched chain amylenes. To this end the mixed amylenes are preferably contacted with sulphuric acid a plurality of times until the branched chain amylenes are substantially completely stripped from the mixture. Similarly the sulphuric acid is preferably contacted a plurality of times with mixed amylenes until the acid is substantially completely saturated with branched chain amylenes. It has been found that the successive contacting of both the acid and mixed amylenes can be practiced advantageously in counterflow wherein the fresh mixed amylenes are contacted with the acid which has already absorbed some branched chain amylenes, and thereafter contacted with fresher acid until it is substantially stripped of branched chain amylenes. Similarly the acid may be first contacted with a mixture of normal and branched chain amylenes which has previously been contacted with acid, and thereafter treated with a fresh mixture of amylenes, the mixture of amylenes last mentioned being re-contacted with the acid at an earlier step in the process.

By subjecting the olefine mixture to countercurrent contact with sulphuric acid of the desired concentration in the manner above indicated, it has been found that a much smaller amount of sulphuric acid suffices to effect the desired absorption than might appear to be theoretically necessary to effect this result. While we are unable to assign a completely satisfactory theoretical reason for this result, it has been suggested that the initial effect of the contact of sulphuric acid with the olefine mixture is to produce olefine hydrogen sulphate and that the consequence of continued contact of the constituents of the mixture is to effect the absorption of further olefine in this olefine hydrogen sulphate. In accordance with this theory, the olefine is selectively absorbed in olefine hydrogen sulphate rather than in sulphuric acid itself.

Advantages of the above illustrated features of this invention are that branched chain amylenes can be absorbed in sulphuric acid solution and separated from unabsorbed normal amylene before the normal amylene is absorbed in the acid solution to an objectionable degree and before the branched chain amylenes are excessively polymerized or otherwise decomposed by the acid. Furthermore, the branched chain amylenes thus separated from the normal amylene can, if desired, be subsequently treated with a hydroxy aryl compound, for example, to form alkyl reaction products or separated from the acid before excessive polymerization of branched chain olefines by the sulphuric acid. When, however, the branched chain amylenes are to be treated with a hydroxy aryl compound to form alkyl reaction product it is an advantage that the sulphuric acid which is mixed with the separated branched chain amylenes may be employed to promote the reaction to form alkyl reaction products.

In the practice of this invention phosphoric acid can be used in the same manner in which use of sulphuric acid is herein described, making suitable adjustments of proportions and operating conditions, for effecting separation of mixed olefines and promoting reaction.

It is a further feature of this invention that it affords a high recovery of acid, used for effecting separation and for catalytically promoting reaction, in an undiluted and uncontaminated condition. To this end it is a further feature of this invention that after phenol, for example, is added to sulphuric acid containing absorbed branched chain amylenes, for example, the reaction is not carried directly to the formation of the alkyl phenol but the reaction is permitted to be only partially completed. After the phenol has been added to the acid mixture an oil layer separates from the bulk of the acid, which oil layer is believed to comprise amyl phenyl ether. While the rearrangement of amyl phenyl ether to form tertiary amyl phenol can be effected by refluxing the mixture, it has been found that the acid becomes reddish in color, during refluxing, and gains in both volume and weight, due, it is believed, to the formation of phenol sulphonic acid. Repeated extractions have failed to properly recondition the acid. After a single run to produce the alkyl aryl hydroxy compound it becomes unsuitable for further use. Accordingly, it is a feature of this invention that the oil layer is separated from the acid layer prior to refluxing the acid to form alkyl phenol. In this way about 95% of the acid is preserved from contamination by objectionable side reactions. It is an added advantage of this procedure that the recovered acid does not have to be reconcentrated for use in making additional successive runs.

After the separation of the acid layer and before refluxing to form tertiary amyl phenol, for example, some acid remains in the oil layer. For example, the acid retained in the oil layer may amount to about 5%. This amount of acid has been found to be ample to act as a catalyst in effecting the rearrangement of amyl phenyl ether to form tertiary amyl phenol, for example, and it is a feature of this invention that the rearrangement treatment is thus effected in the presence of a small amount of catalyst. The addition of further amounts of acid does not materially increase the yields and as the acid which is used in the rearrangement of the ether to alkyl phenol is badly contaminated by reaction side products it is preferable to employ a small amount of acid in the rearrangement step. The volume of acid catalyst that is used is so small that it may be either wasted or may be easily reconcentrated, in which latter case the high temperatures employed drive off the contaminating substances, side products and the like.

It is an advantage and feature of this invention that the sulphuric or phosphoric acid in being carried through the treatment first acts as a selective absorbing material whereby branched chain amylenes are substantially completely isolated from normal amylene, and also acts as a catalyst or reagent in the process of reacting branched chain amylenes with phenol, for example, to form amyl phenyl ether and tertiary amyl phenol.

While the separation of branched chain amylenes from normal amylene as hereinabove described is of special advantage in cooperating with other features and steps of this invention to produce tertiary amyl phenol, for example, it is apparent that the separation of branched chain olefines from normal olefine contained in a mixture of normal and branched chain olefines such as normal and branched chain amylenes, is of general advantage and applicability. For example, after branched chain olefin has been separated from normal olefine as above described the separated branched chain and normal olefines may not only be treated by separate appropriate methods with hydroxyl aryl compounds to form alkyl aryl hydroxy compounds but also may be treated as thus separated by methods appropriate to each so as to convert them to corresponding alcohols as described in another application about to be filed covering such a process. Moreover, there are also other applications and advantages in the separation of normal olefines from branched chain olefines contained in a mixture of normal and branched chain olefines according to this invention.

If the final product desired is alkyl aryl ether it is not essential in the practice of this invention to carry the reaction through to form alkyl aryl hydroxy compounds, but features of this invention may be employed in the manufacture of amyl phenyl ether, for example. If the ether is the desired final product it may be washed and purified as by washing with water, neutralizing traces of residual acid with dilute weak alkali, and distilling to produce as close a boiling final product as may be desired.

If the amyl phenyl ether, for example, is to be rearranged to form amyl phenol, it is not absolutely essential in the practice of this invention that sulphuric acid be used as the catalyst. Thus catalysts such as zinc chloride or hydrochloric acid, or both, or phosphoric acid have been found to operate effectively to aid in the rearrangement. The use of sulphuric acid is, however, regarded as being normally preferable as larger yields are usually obtained when the catalyst is sulphuric acid. If in certain instances it is desirable to use other catalysts than sulphuric or phosphoric acid in treating alkyl aryl ethers and analogous substances to form alkyl aryl hydroxy compounds by rearrangement, the acid can readily be removed if desired and the ether treated with another agent or catalyst. The presence of some catalyst is required, however, in the practice of this invention for the production of good yields. Similarly the separated branched chain amylenes may be treated with phenol in the first instance in the presence of other catalysts than sulphuric or phosphoric acid to form amyl phenyl ether but the acid treatment above described is regarded as preferable both because of the better yields that are obtained and because utilization is made of the acid used in the separation step where separation of branched chain amylenes from a mixture of normal and branched chain amylenes is desirable by absorption in acid. If desired a common solvent for olefine and sulphuric or phosphoric acid can be employed in conjunction therewith such as acetic acid but the use of such solvent is not regarded as essential and it is normally preferable to practice this invention without the use of such solvent.

It is a further feature of this invention that the sulphuric or phosphoric acid which is used in effecting selective absorption of branched chain olefines from a mixture of normal and branched chain olefines, and is thereafter used in making alkyl reaction products is treated so as to adapt it for the special conditions and purposes incident to reuse in the selective absorption step. To illustrate, the acid which is separated after the formation of amyl phenyl ether, for example, as above described, contains some phenol and some products of the reaction, e. g., amyl phenyl ether. A slight amount of additional amyl phenyl ether is, in commercial operation, also taken out with the acid in effecting the separation of the acid from the oil layer. The strength of the acid is, however, substantially unchanged and, since it has not been heated or refluxed with the ether, it is relatively free of side products of the reaction. It is a feature of this invention that the acid thus removed from the ether layer is extracted with an inert solvent such as pentane to remove such contaminating substances, such as phenol and amyl phenyl ether.

The recovery of phenol by extracting it from the sulphuric acid by means of an inert solvent at this stage is highly important, as such phenol will react with the sulphuric acid and amylene in the subsequent absorption step to form an amyl phenyl ether which will be retained with the normal amylene unless it is so separated. The extraction of the phenol and the phenyl ether thus effects an economy both by reason of the fact that it avoids a loss of these materials and because it increases the proportionate yield of branched chain amylenes in the subsequent absorption step in which the purified acid is reused.

While mention has been made of the use of pentane as an inert solvent for extracting the acid, it is apparent that other inert solvents may also be used in the practice of this invention such as di-ethyl ether, benzene, etc.

After the alkyl phenyl ether has been refluxed to produce alkyl aryl hydroxy compound, the crude alkyl aryl hydroxy compound is preferably re-worked to yield a product of desired purity. During refluxing of alkyl aryl ether to form alkyl aryl hydroxy compound, it has been found that the sulphuric acid catalyst becomes substantially immiscible in the alkyl aryl hydroxy compound. It has also been found that the presence of the catalyst during distillation to re-work the crude alkyl aryl hydroxy compound is disadvantageous as tending to produce undesirable side products during distillation. Accordingly, it is a feature of this invention that the acid catalyst is separated from the crude alkyl aryl hydroxy compound before the latter compound is re-worked by distillation. Moreover, it is a further feature of this invention that the crude alkyl aryl hydroxy compound is substantially neutralized as by use of soda ash solution or other alkali prior to distillation. By first decanting the separated acid layer from the oil layer and washing the oil layer with water, a minimum of soda ash solution need be employed in neutralization in the practice of this invention.

Furthermore, features of this invention relate to certain novel procedure which increases the yields obtainable in a plurality of runs and aids in making the practice of the present invention economical commercially. For example, a feature of this invention lies in heating a mixture of olefine and hydroxy aryl material in the presence of a catalyst such as sulphuric acid to form a mixture of alkyl aryl ether and alkyl aryl hydroxy compound and then separating the ether from the alkyl aryl hydroxy compound as by distillation. The separated alkyl aryl ether is thereafter refluxed to form alkyl aryl hydroxy compound and if desired the ether is separated from any contaminating substance such as water prior to such refluxing. As above pointed out, it is preferable to wash the mixture of alkyl aryl ether and alkyl aryl hydroxy compound and is preferable also to neutralize the mixture prior to distillation.

Other novel features of this invention lie in extracting catalyst separated from the refluxing treatment with an inert solvent such as pentane and subjecting the material extracted from the catalyst, stripped of solvent, to a succeeding refluxing treatment. Moreover, such steps as extracting wash water with an inert solvent, extracting the alkaline wash with an inert solvent preferably after acidification, separating water wash from alkaline wash, etc. are all novel features of this invention.

For purposes of illustration, the manufacture of tertiary amyl phenol from the mixture of normal and branched chain amylenes, pentane and minor amounts of other constituents which are obtained as by-products in the manufacture of amyl alcohol, as mentioned above, will now be described in connection with the accompanying flow-sheet. The mixture of amylenes may be assumed for purposes of illustration to comprise about 45% normal amylene, about 45% branched chain amylenes, about 8% pentane, and about 2% of other hydrocarbons.

The branched chain amylenes are separated from normal amylene, pentane, and other ingredients of the mixture by selectively absorbing branched chain amylene to substantial completion in counter-flow with sulphuric acid so that the acid becomes substantially completely saturated with the branched chain amylenes before the normal amylene is substantially absorbed or otherwise acted upon by the acid and before the branched chain amylenes are substantially polymerized by the acid. The absorption can be conveniently effected in a mixing tank such as mixing tank 10 indicated on the flow sheet which may be provided with a cooling coil or jacket (not shown) and an agitator (also not shown). The mixing tank 10 is first charged with fresh acid of about 62% concentration from supply tank 1 or from acid receiver 2 or both through lines 3 and 4. The charged acid may weigh, for purposes of illustration, 6821 pounds. A mixture containing normal and branched chain amylenes is then contacted with the acid. In normal treatment of successive batches the mixed amylenes are taken from mixed amylene receiver 8 which contains a mixture of normal and branched chain amylenes from which part of the branched chain amylenes has already been absorbed in another step in the process, as will be described below. About 2510 pounds, for example, of amylenes from receiver 8 are preferably mixed with the acid in receiver 10 and the mixture is agitated for about one hour while maintaining the temperature between about 20° C. and about 28° C. By so doing only the branched chain amylenes become absorbed in the sulphuric acid, the normal amylene being substantially unabsorbed, and as part of the branched chain amylenes have already been removed from the amylene mixture, the mixture is substantially stripped of branched chain amylenes, leaving a separable oily layer containing the normal amylene, and pentane. The acid, on the other hand, is not completely saturated with absorbed branched chain amylenes.

The mixture, after the absorption of the branched chain amylenes therein is completed, is dropped to separator 11 by line 12, where the unabsorbed normal amylene and pentane form a separate oil layer. The acid containing absorbed branched chain amylenes is pumped through line 13 to mixing tank 10 to be utilized in the further absorption of branched chain amylenes. As the oil layer containing normal amylene and pentane has been substantially stripped of branched chain amylenes, it can be withdrawn from separator 11 by lines 14, 15 and 17 to receiver 18 for appropriate treatment as will be described below.

The recirculated acid in mixer 10 which contains absorbed branched chain amylenes may be further contacted with mixed normal and branched chain amylenes for the absorption therein of additional branched chain amylenes In order that the acid containing branched chain amylenes may be fully saturated with branched chain amylenes in the second absorption, it is preferable to contact with the acid a fresh mixture of normal and branched chain amylenes from storage tank 5 by lines 6 and 7. About 3430 pounds of the fresh mixed amylenes may be added. The mixture is again agitated for about one hour at a temperature of from about 20° C. to 28° C. Since there is present in the mixture an excess of branched chain amylenes above that which can be absorbed in completely saturating the acid, the acid containing branched chain amylenes becomes substantially completely saturated with further branched chain amylenes. The branched chain amylenes are, on the other hand, only partially absorbed from the mixture of normal and iso amylenes. After absorption, the mixture is again dropped to separator 11 and the acid is again recirculated to mixer 10 for subsequent treatment with phenol. The residual mixed normal and some unabsorbed branched chain amylenes and pentane are pumped by lines 14, 15 and 16 to partially absorbed amylene receiver 8 where they are available for succeeding selective absorption treatments.

By the foregoing procedure the branched chain amylenes are substantially isolated from the mixture of normal and branched chain amylenes. Moreover, by isolating the branched chain amylenes in the above manner, namely as absorbed by sulphuric acid, it is at the same time prepared for the succeeding phenol treatment.

While the above described absorption and isolation treatment is satisfactory in actual practice it is apparent that the manner of absorption can be varied without departing from the scope of this invention. Thus, for example, instead of subjecting the acid and mixed amylenes to two successive absorption treatments, it is apparent that either or both of these materials may be subjected to a greater or lesser number of treatments in counterflow. Moreover, while absorption of branched chain amylenes by counterflow of mixed normal and branched chain amylenes with sulphuric acid is regarded as preferable, it is apparent that some absorption can be secured in the practice of this invention without employing the counterflow principle. In general the greater the amount of branched chain amylenes in the mixture of normal and branched chain amylenes, the fewer steps in counterflow are required. On the other hand, a low percentage of branched chain amylenes in the mixture requires more numerous contacts in step-wise counterflow to effect substantially complete separation of the branched chain amylenes and at the same time a substantially complete saturation with branched chain amylenes of the acid which contains branched chain amylenes.

By the absorption treatment as above described, the branched chain amylenes, about 25.5% of the mixture of normal and branched chain amylenes, are substantially stripped therefrom. During the process about 69% of the mixed amylenes remains unabsorbed and is separated off for further treatment. There is a loss during absorption of about 5% of the mixed hydrocarbons. Thus, for example, starting with 5950 pounds of mixed normal and branched chain amylenes, about 1515 pounds of branched chain amylenes become absorbed in the sulphuric acid and about 8336 pounds of the mixture of acid and absorbed branched chain amylenes are left in the mixer and are immediately available for the phenol treatment.

While the foregoing has been described as illustrative of the isolation of branched chain amylenes by selective absorption in sulphuric acid after a previous run has been made, it is apparent that the procedure is substantially the same in making a first run, only instead of using acid from acid receiver 2 and mixed amylenes from which branched chain amylenes have been partially absorbed from receiver 8, fresh acid and fresh mixed amylenes from storage tanks 1 and 5 respectively may be first mixed in mixer 10. After the absorption treatment, as hereinabove described, the separated amylenes can be taken to storage tank 8 for further treatment to completely strip the mixture of branched chain amylenes and the acid can be recirculated to mixer 10 for treatment with another charge of mixed amylenes in order to completely saturate it with branched chain amylenes. After a mixture of acid and branched chain amylenes has become substantially completely saturated with branched chain amylenes the mixture of acid and branched chain amylenes is available for the phenol treatment.

As above mentioned it may be assumed for purposes of illustration that there is in mixer 10 after the absorption step about 8336 pounds of mixed acid and absorbed branched chain amylenes. This mixture is substantially free of normal amylene and pentane. Assuming this to be the case the mixture can be treated with phenol by adding enough phenol to react with branched chain amylenes absorbed therein. This amount for the illustration above given is about 1996 pounds of phenol. The phenol may be flowed from heater 19 to sump 20 from which it is pumped by line 21 to mixer 10. The mixture of phenol and acid is agitated at a temperature between approximately 20° C. and 28° C. for about an hour. During the agitation it is believed that the branched chain amylenes react with the phenol in the presence of the sulphuric acid to form tertiary amyl phenyl ether. The ether separates from the said acid as an oily layer. In this connection it may be pointed out that the sulphuric acid which is carried down from the absorption step plays an important role in promoting the reaction between the branched chain amylenes and phenol. Moreover, if branched chain amylenes are converted to amyl phenyl ether without unnecessary delay, the sulphuric acid does not act to undesirably or excessively polymerize the branched chain amylenes. It is, therefore, preferable to cause the reaction between phenol and branched chain amylenes to take place without permitting the acid to stand for long periods of time and before the branched chain amylenes are excessively polymerized by the acid.

The reaction having been completed, the mixture is dropped to separator 11 and after separate layers have formed the acid layer is dropped to acid receiver 22 leaving the tertiary amyl phenyl ether as a crude oil layer weighing about 3651 pounds in separator 11. About 206 pounds of the ether which is dissolved in the separated acid can be recovered as will be described below. A small amount of sulphuric acid (about 166 pounds) remains in the crude oil layer and aids in the rearrangement of the ether to phenol.

If the amyl phenyl ether is the product desired it can be washed, neutralized and distilled to get a cut having as narrow a boiling range as may be desired. If the tertiary amyl phenol is the desired product the washing is unnecessary as the retention of the sulphuric acid in the mixture is desirable in promoting the rearrangement of the amyl phenyl ether to form amyl phenol. While the amyl phenyl ether could be separated from the sulphuric acid and the amyl phenyl ether could be rearranged to amyl phenol in the presence of other catalysts than sulphuric acid in the practice of this invention, it is normally preferable to employ sulphuric acid as a catalyst in the rearrangement step.

The tertiary amyl phenyl ether is rearranged to tertiary amyl phenol by refluxing the crude ether containing a small amount of retained sulphuric acid in separator 11 for about four hours at a temperature preferably between about 110° C. and about 135° C. It is regarded as preferable to maintain the temperature of the reflux somewhat below 140° C. as higher temperatures have been found to hinder the rearrangement of the ether to phenol and to cause the acid which is present to lose its strength by evolution of $SO_2$. It is believed that upon refluxing the retained sulphuric acid acts as catalyst or condensing agent, promoting the rearrangement of the ether to form para tertiary amyl phenol. Upon formation of the amyl phenol, the acid in the mixture substantially separates therefrom and may be dropped by line 23 to receiver 24 leaving the para tertiary amyl phenol. About 17 pounds of the crude amyl phenol is removed with the separated acid and may be recovered as described below. About 500 gallons of wash water from water container 25 may next be run into separator 11 which, after suitable contact, is also run into acid receiver 24.

The washing is completed by running about 300 gallons of 5% soda ash solution from tank 28 into separator 11 by lines 29 and 27 which neutralizes the free sulphuric acid in the crude amyl phenol and is a desirable feature of treatment in preparing such phenol for the distillation treatment. The number of washes with water or soda ash solution can, of course, be varied in the practice of this invention. The washings are preferably carried out at about 100° C. in order to prevent the phenol from solidifying and forming persistent emulsions. The separated carbonate wash is dropped to receiver 31 by lines 23 and 30. About 34 pounds of the crude amyl phenol can be extracted from the washings.

The crude amyl phenol remaining in separator 11 (about 3405 pounds) may be purified if desired in the practice of this invention. To this end the crude amyl phenol can be taken to still 33 by line 32 where it can be distilled preferably under reduced pressure such as 30 mm. of mercury. The heads which are taken off comprise phenol, amyl phenyl ether, water and some amyl phenol. The distillation of heads may be continued till the temperature reaches about 115° C. when about 18% or 19% of the crude phenol will have been taken off. The heads are taken off through lines 34 and 35 to receiver 36 where the water is permitted to separate from the amyl phenyl ether and amyl phenol. The water may then be dropped by lines 36 and 37 to the sewer or subjected to suitable chemical treatment to recover the last traces of phenol. The mixture of ether and some phenol is then dropped to receiver 40 by lines 36, 38 and 39.

After the heads have been taken off the final product, tertiary amyl phenol, is dropped by lines 34 and 42 to receiver 41 from which it can be taken for packing and shipment. About 148 pounds of residue remain in the still and may be withdrawn.

During distillation a reduced pressure can be maintained in the distillation system by any suitable vacuum pump such as pump 43. The maintaining of a reduced pressure during distillation is useful in the practice of this invention in preventing the decomposition of the phenol and preventing the formation of undesirable reaction side products. The final product as thus obtained is about 2637 pounds or about 75% of the theoretical. This yield is however increased upon recovery of values from the distillation heads, the absorption acid, and the washes, as will be described below.

It was pointed out above that the absorption acid separated from the amyl phenyl ether, was dropped to acid receiver 22. A small amount of this acid is taken off through line 44 to small acid receiver 60 where it is available for acidifying the soda ash wash in wash receiver 31. The principal body of acid in receiver 22 is, however, pumped by lines 45, 46 and 47 to separator 11 where it is extracted with an inert solvent such as pentane to recover any amyl phenyl ether or phenol remaining therein. The pentane is introduced into separator 11 from pentane storage tank 48 by lines 49 and 47. Preferably the acid should be subjected to two extractions using about 200 gallons of pentane for each extraction. The extracted acid is taken off by lines 14, 50 and 51 and pumped to acid storage tank 2, and it is to be noted that it is available for use in subsequent runs without further purification or concentration. The pentane extractions pass by line 14 and 52 to stripping column 53 where the pentane is recovered. The recovered pentane passes by line 54 to condenser 55 and back to pentane storage tank 48. The extracted product, which is principally composed of amyl phenyl ether, is dropped by line 39 to receiver 40.

The carbonate wash, after being acidified as above described, may also be extracted with pentane by pumping it by lines 59, 56, 46 and 47 to separator 11 where it is extracted with pentane from tank 48. The extracted sulphate is dropped to the sewer by lines 57, 58 and 37. The pentane extraction is taken to stripping column 53, the recovered pentane being returned to tank 48. The crude amyl phenol from the extraction is dropped to receiver 40.

In receiver 40 there will have been collected a mixture of tertiary amyl phenyl ether and crude tertiary amyl phenol from (1) the heads taken from still 33, (2) the pentane extraction of the absorption acid taken from acid receiver 22, (3) the pentane extraction from the dilute acid collected in receiver 24, and (4) the pentane extraction of the carbonate wash water collected in receiver 31. The mixture in receiver 40 can be combined with the next batch of tertiary amyl phenyl ether that is refluxed in separator 11 for the conversion of the ether into the corresponding phenol. By thus returning the distillation heads and extraction products to subsequent batches, the yield of tertiary amyl phenol according to the above illustrated process is increased to greater than 80% of the theoretical.

In the foregoing description illustrative of this invention the separated branched chain amylene only is converted to tertiary amyl phenol. As above described, the normal amylene is separated substantially completely from the branched chain amylene and is taken from the process together with pentane and small amounts of other hydrocarbons.

The normal amylene constituent of the separation can be treated in several ways as desired. If it is desired to make secondary amyl phenyl ether therefrom, the separated normal amylene can be treated with phenol in the presence of sulphuric acid in substantially the same manner that the branched chain amylenes were treated in the foregoing illustration of this invention to form tertiary amyl phenyl ether. The secondary amyl phenyl ether can be washed and purified if desired and close cut fractions obtained. In producing secondary amyl phenol by rearrangement of the secondary amyl phenyl ether, the illustrative procedure above described for rearrangement of tertiary amyl phenyl ether to form tertiary amyl phenol will be found to give low yields of secondary amyl phenol. However, satisfactory commercial yields of secondary amyl phenol from normal olefines and hydroxy aryl compound, e. g., normal amylene and phenol, can be obtained by promoting the rearrangement of secondary amyl aryl ethers and allied compounds to form secondary amyl aryl hydroxy compounds, by employing more severe treating conditions, i. e., longer contact periods, higher temperatures (e. g. in the neighborhood of 190° C.), and large amounts of catalyst (e. g. added sulphuric acid) than in the corresponding case of tertiary amyl phenol. Also, it is advantageous to employ zinc chloride and benzene sulphonic acid as catalysts instead of relying upon the residual sulphuric acid in the ether formed in the presence of sulphuric acid. The separated normal amylene can also be used for other purposes, such as the manufacture of alcohols as described in another separate application to be filed.

It is to be understood in connection with the foregoing description of the practice of this invention in the manufacture of products resulting from the condensation of amylenes with hydroxy aryl compound, that such description is merely for purposes of illustration and that the invention is not limited thereto, that considerable variation is permissible in the temperatures and pressures employed and in the periods of treatment, that the particular flow of materials indicated may be considerably changed, that the quantities of materials and reagents employed may also be considerably changed within the scope of this invention, that features of this invention may be practiced in connection with other olefines or mixtures thereof and especially olefines of 4 to 6 carbon atoms to produce alkyl aryl ethers and alkyl aryl hydroxy compounds having corresponding alkyl radicals, and that features of this invention may also be employed in connection with the production of condensation products of hydroxy aryl compound with other unsaturated hydrocarbons. For example, normal and branched chain butylenes or mixtures thereof and normal and branched chain hexylenes or mixtures thereof may be treated in accordance with this invention. In the case of butylenes which are gaseous at normal pressures and temperatures, either the butylene gas could be contacted with sulphuric acid to absorb selectively the branched chain butylenes and separate them from the normal butylene, or the butylene could all be maintained in liquid phase by increase of pressure or decrease of temperature, or both, and then treated as a liquid with sulphuric acid.

As further examples, unsaturated hydrocarbons other than olefines of the ethylene series may be employed in the practice of this invention as above stated. Thus, 272 grams of pinene, 186 grams of phenol and 5 grams of sulphuric acid in 10 grams of acetic acid, were reacted in a reaction which proceeded violently to produce an excellent product comprising pinene phenol. Again, 70 grams of isoprene, 93 grams of phenol and 2 grams of sulphuric acid in 10 cc. of acetic acid reacted readily to produce isoprene phenol as a viscous oil having a boiling point between 250° C. and 260° C. at 20 mm. (mercury) pressure. Again, 235 grams of a distillate fraction containing indene and obtained from coal tar, 186 grams of phenol, and 5 grams of sulphuric acid in 15 cc. of acetic acid reacted readily to produce a product having a boiling point of 180° C. to 190° C. at 10 mm. (mercury) pressure and comprising indene phenol which upon treatment with hexamethylene tetramine produces a beautiful resin.

Additional examples of hydroxyl aryl compounds that may be used to form condensation products in accordance with the principles of this invention are naphthol, rescorcinols, cresol and thymol.

We claim:

1. The method of making an alkyl derivative of a compound including at least one benzene ring having at least one hydroxyl radical attached to a nuclear carbon atom by reaction of olefine material with the compound in the presence of a catalyst which comprises selectively absorbing the desired olefine material in sulphuric acid from a mixture of olefines and thereafter reacting with the compound the desired olefine material in the presence of the sulphuric acid absorbent.

2. The method of making tertiary alkyl derivatives of a single benzene ring compound having at least one hydroxyl radical attached to a nuclear carbon atom of the ring by treatment of a mixture of normal and branched chain olefines of four to six carbon atoms, which comprises contacting the mixed olefines with sulphuric acid to absorb the branched chain olefine material therein, separating the branched chain olefine material from the unabsorbed normal olefine material before the normal olefine material is substantially absorbed by the acid, and reacting the separated branched chain olefine material with the single ring compound to form the desired tertiary alkyl derivative, the sulphuric acid absorbent acting to promote the reaction between the separated branched chain olefine material and the single ring compound.

3. In a method of making tertiary alkyl derivatives of a compound including at least one benzene ring having at least one hydroxyl radical attached to a nuclear carbon atom thereof by treatment of mixed normal and branched chain olefines of four to six carbon atoms, the steps comprising absorbing branched chain olefine material in sulphuric acid from a mixture of branched chain and normal olefine material, separating the sulphuric acid containing the branched chain olefine material from the unabsorbed olefine material, mixing the separated branched chain material with the ring containing compound in the presence of the sulphuric acid absorbent, and refluxing the mixture to form the desired derivative.

4. In a method of treating mixed normal and branched chain isomers of olefines of four to six carbon atoms the steps comprising absorbing in sulphuric acid the branched chain olefine material in the mixture, separating the sulphuric acid containing the branched chain olefine material from the unabsorbed olefine material before the normal olefine material is substantially absorbed in the sulphuric acid, and then reacting with a compound including at least one benzene ring to at least one nuclear carbon atom of which an hydroxyl radical is directly attached the branched chain olefine material absorbed in the sulphuric acid, to form a reaction product insoluble in the acid, before substantial polymerization of the branched chain olefine by the sulphuric acid.

5. In a method of making tertiary alkyl derivatives of a compound including at least one benzene ring to at least one nuclear carbon atom of which is directly attached a hydroxyl radical by treatment of mixed normal and branched chain isomers of olefines of four to six carbon atoms, the steps comprising contacting sulphuric acid with the mixed normal and branched chain olefines in counter-flow stepwise manner, thereby selectively absorbing branched chain olefine material in the sulphuric acid, separating the unabsorbed hydrocarbon including the normal olefine material from the acid solution containing the absorbed branched chain olefine material, and treating with a compound including at least one benzene ring to at least one nuclear carbon atom of which is directly attached an hydroxyl radical the acid containing the absorbed branched chain olefine material to form an oily layer which is immiscible with the acid.

6. In a method of making a tertiary alkyl derivative of a compound including at least one benzene ring to at least one of the nuclear carbon atoms of which is directly attached an hydroxyl radical by treatment of mixed normal and branched chain isomers of olefine material of four to six carbon atoms, the steps comprising contacting sulphuric acid with the mixed normal and branched chain olefines in counter-flow step-wise manner, thereby selectively absorbing branched chain olefine material in the sulphuric acid, separating unabsorbed hydrocarbon including the normal olefine material from the acid solution containing the absorbed branched chain olefine, treating with a compound including at least one benzene ring to at least one nuclear carbon atom of which is directly attached an hydroxyl radical the acid containing absorbed branched chain olefine to form an oil layer which is immiscible with acid, separating the bulk of the acid from the oil layer, and refluxing the oil layer in the presence of sulphuric acid to form the desired tertiary alkyl derivative.

7. A process for the manufacture of tertiary amyl phenol which comprises contacting sulphuric acid with a mixture of hydrocarbons comprising normal and branched chain amylenes in counter-flow stepwise manner, thereby selectively absorbing branched chain amylene material in the sulphuric acid, separating unabsorbed hydrocarbons including normal amylene material from the acid solution containing the absorbed branched chain amylene material, treating the separated iso-amylene material in the presence of the sulphuric acid absorbent with phenol to form an oil layer which is immiscible with the acid, separating the bulk of the acid from the oil layer and refluxing the oil layer in the presence of sulphuric acid as a catalyst thereby forming tertiary amyl phenol.

8. A process for the manufacture of a tertiary amyl aryl hydroxy compound which comprises contacting sulphuric acid with a mixture of hydrocarbons including normal and branched chain amylenes in counter-flow stepwise manner, thereby selectively absorbing branched chain amylene material in the sulphuric acid, separating unabsorbed hydrocarbons including normal amylene material from the acid solution containing the absorbed branched chain amylene material, treating the separated branched chain amylene material in the presence of the sulphuric acid absorbent with a compound including at least one benzene ring to at least one of the nuclear carbon atoms of which is directly attached an hydroxyl radical to form an oil layer which is immiscible with the acid, separating the bulk of the acid from the oil layer, and refluxing the oil layer in the presence of sulphuric acid as a catalyst thereby forming the tertiary amyl compound.

9. In a process for the manufacture of tertiary amyl aryl ether, the steps comprising contacting sulphuric acid with a mixture of hydrocarbon including normal and branched chain amylene in counter-flow stepwise manner, thereby selectively absorbing branched chain amylene material in the sulphuric acid, separating unabsorbed hydrocarbon including normal amylene material from the acid solution containing the absorbed branched chain amylene material, treating the separated branched chain amylene material in the presence of the sulphuric acid absorbent with a compound including at least one benzene ring to at least one nuclear carbon atom of which is directly attached an hydroxyl radical to form an oil layer which is immiscible with the acid and comprises tertiary amyl aryl ether, and separating acid from the oil layer.

10. In a method of making tertiary amyl aryl ether from a mixture of normal and branched chain amylenes by reacting part of the amylene material with a compound including at least one benzene ring to at least one nuclear carbon atom of which is directly attached an hydroxyl radical, the steps which comprise absorbing branched chain amylene material in sulphuric acid from a mixture of hydrocarbons comprising normal and branched chain amylenes, separating from the mixture acid containing branched chain amylene material, and mixing the ring compound with the acid containing branched chain amylene material.

11. In a method of making an amyl aryl compound by treatment of a mixture of normal and branched chain amylenes by reacting a part of the amylene material with a compound including at least one benzene ring to at least one nuclear carbon atom of which is directly attached an hydroxyl radical, the steps which comprise substantially separating the branched chain material from the normal amylene material of the mixture and thereafter mixing with the ring compound one of the constituents of the separation in the presence of sulphuric acid, and thereby forming an oily layer which is immiscible with the acid, separating the bulk of the acid from the oily layer, and refluxing the oily layer in the presence of residual acid to form the desired amyl aryl compound.

12. In a method of making a tertiary alkyl derivative of a compound including at least one benzene ring to at least one nuclear carbon atom of which is directly attached an hydroxyl radical by treatment of mixed normal and branched chain isomers of olefines of four to six carbon atoms, which comprises absorbing in sulphuric acid branched chain olefine material from a mixture of branched chain and normal olefines of four to six carbon atoms, mixing a compound including at least one benzene ring to at least one nuclear carbon atom of which is directly attached an hydroxyl radical with the sulphuric acid solution of the branched chain olefine to form tertiary alkyl aryl ether which is immiscible with the sulphuric acid, separating immiscible sulphuric acid from the ether, and heating the ether in the presence of sulphuric acid to form the alkyl aryl hydroxy compound.

13. In a method of making alkyl aryl hydroxy compounds wherein an olefine having four to six carbon atoms is reacted with an aryl compound having an hydroxyl radical attached to a nuclear carbon atom in the presence of sulphuric acid, the steps comprising reacting the olefine with the aryl hydroxy compound in the presence of sulphuric acid while cool to form an ether, separating acid immiscible with the ether, and heating the ether in the presence of residual acid to convert it to the desired alkyl aryl hydroxy compound.

14. In a process wherein an olefine and an aryl compound having an hydroxyl radical attached to a nuclear carbon atom are heated in the presence of an acid catalyst to form an alkyl substituted derivative of the aryl compound, the steps which comprise absorbing the olefine in the acid catalyst, mixing the hydroxy aryl compound with the acid containing the absorbed olefine to form a reaction product which is partially immiscible in the acid, separating immiscible acid from the reaction product and thereafter heating said reaction product to convert it to the desired alkyl aryl hydroxy compound.

15. A method which comprises absorbing in sulphuric acid branched chain olefine material from a hydrocarbon mixture comprising normal and branched chain olefines, separating sulphuric acid containing absorbed branched chain olefine material from unabsorbed normal olefine material before the normal olefine material is substantially absorbed by the sulphuric acid, adding a compound including at least one benzene ring to at least one nuclear carbon atom of which is directly attached an hydroxyl radical to the mixture of branched chain olefines and sulphuric acid to form a reaction product between the branched chain olefine material and the compound which is partially immiscible with the sulphuric acid solution, separating immiscible acid from said reaction product, extracting said acid with an inert solvent, and contacting said extracted acid with fresh hydrocarbon mixture comprising normal and branched chain olefines.

16. In a method of making an hydroxy aryl compound, wherein the corresponding ether is rearranged to form the desired compound by heating in the presence of sulphuric acid and the resulting product is distilled, the step comprising separating sulphuric acid immiscible with the reaction product from the reaction product prior to the distillation.

17. In a method of making an hydroxy aryl compound, wherein the corresponding ether is rearranged to form the desired compound by heating in the presence of sulphuric acid and the resulting product is distilled, the steps comprising separating sulphuric acid immiscible with the reaction product from the reaction product and washing the reaction product with hot aqueous liquid prior to the distillation.

18. A method of making an hydroxy aryl hydrocarbon compound, which comprises heating an unsaturated hydrocarbon containing a reactive double bond with an hydroxy aryl compound in the presence of sulphuric acid to form a mixture comprising the desired compound and the corresponding ether which is partially immiscible with the sulphuric acid, separating the immiscible acid, washing the mixture with aqueous liquid, neutralizing the mixture, and separating ether from the desired hydroxy aryl hydrocarbon compound by distillation.

19. In a method of making an hydroxy aryl hydrocarbon compound, wherein an unsaturated hydrocarbon containing a reactive double bond is heated with an hydroxy aryl compound in the presence of sulphuric acid, the steps which comprise heating a mixture of the unsaturated hydrocarbon and the hydroxy aryl compound to form a mixture comprising the desired hydroxy aryl hydrocarbon compound and the corresponding ether, washing the mixture with aqueous liquid, separating the ether from the desired hydroxy aryl hydrocarbon compound by distillation, separating water from the ether, and heating the separated ether in the presence of sulphuric acid to convert it to the desired hydroxy aryl hydrocarbon compound.

20. The method of producing an alkyl derivative of a compound including at least one benzene ring to at least one nuclear carbon atom of which is directly attached an hydroxyl radical which comprises treating with an acid catalyst a mixture of olefines which includes olefines of varying reactivity, reacting the more reactive olefine material of the mixture in the presence of the acid catalyst with the ring compound to produce the desired alkyl derivative and removing unreacted olefine from the mixture.

21. The method of producing a tertiary amyl derivative of a compound including at least one benzene ring to at least one nuclear carbon atom of which is directly attached an hydroxyl radical which comprises treating with an acid catalyst a mixture of amylenes which includes both normal and branched chain amylenes, reacting the branched chain amylene material of the mixture in the presence of the acid catalyst with the hydroxy aryl compound to produce the desired tertiary amyl derivative and removing unreacted normal amylene from the mixture.

WILLIAM M. LEE.
LEE H. CLARK.